July 22, 1941.   H. A. TRISHMAN ET AL   2,250,335
BELT PRESS
Filed June 30, 1938    3 Sheets-Sheet 1

INVENTORS
HARRY A. TRISHMAN
AND
GEORGE S. ANDRUS
BY
ATTORNEYS

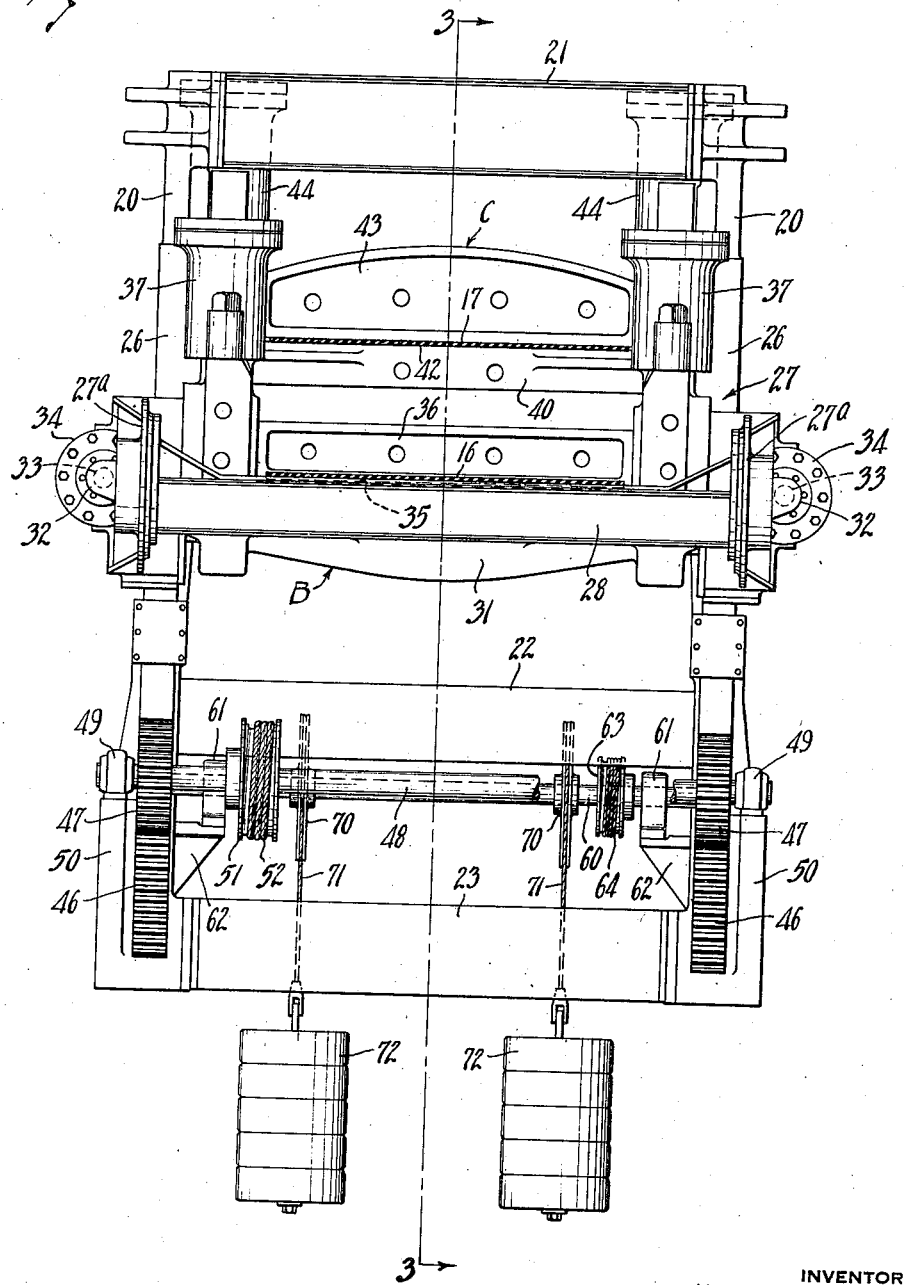

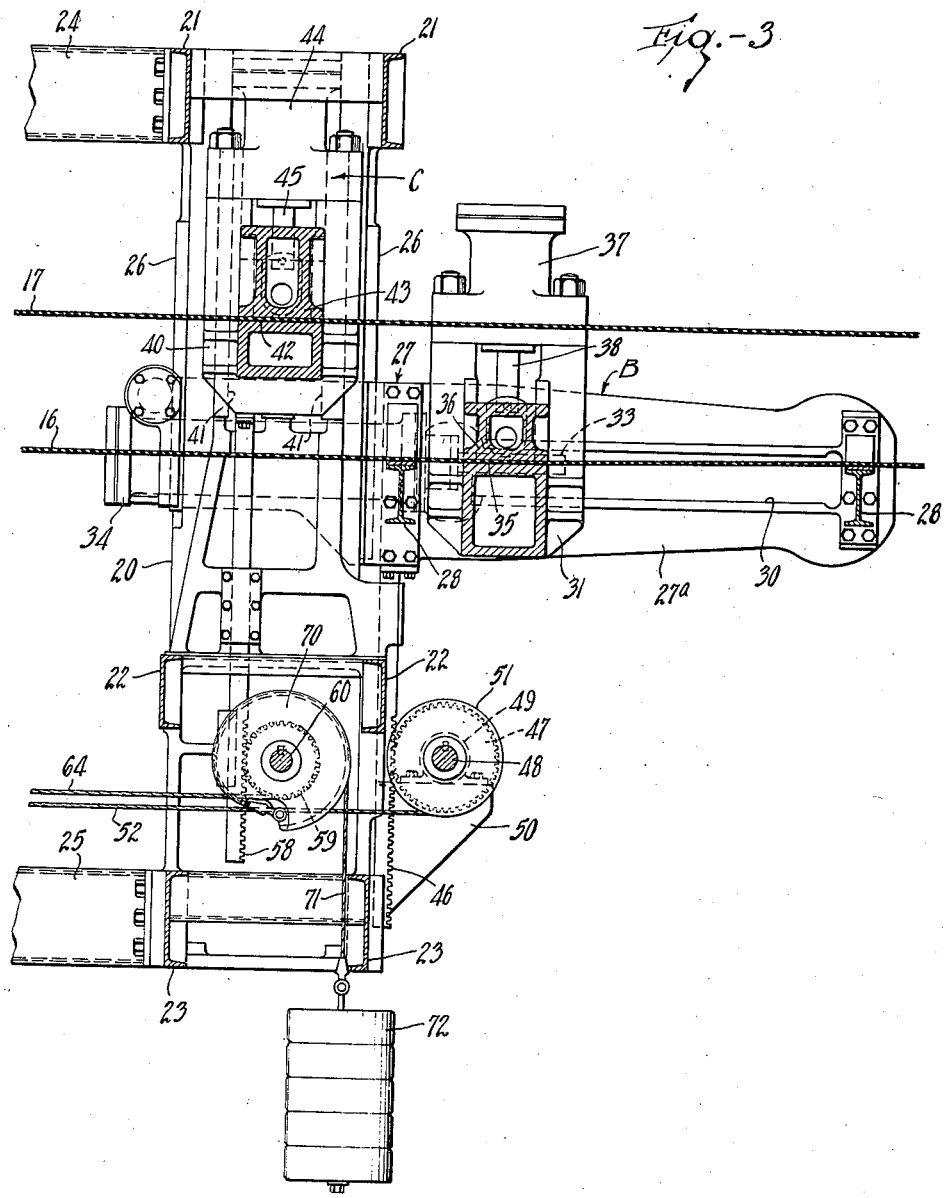

Patented July 22, 1941

2,250,335

UNITED STATES PATENT OFFICE 2,250,335

BELT PRESS

Harry A. Trishman, Cuyahoga Falls, and George S. Andrus, Akron, Ohio, assignors to The Adamson Machine Company, Akron, Ohio, a corporation of Ohio Application June 30, 1938, Serial No. 216,706

2 Claims. (Cl. 18—17)

This invention relates to belt presses such as are used in the rubber industry for vulcanizing conveyor belts and transmission belts of rubber and fabric that are made in long lengths and more especially it relates to improved means for applying longitudinal tension to the belts as they are being vulcanized.

Belt presses of the character mentioned usually comprise three platens so that two belts may be vulcanized at one time. For imparting tension to the belts, fluid pressure operated belt-gripping mechanisms are employed, each belt being gripped at one end by a device that has no movement parallel to the plane of the belt, and being gripped at the other end by a device that has determinate movement parallel to the plane of the press. After both devices have gripped a belt, movement of the latter device away from the press imparts the desired tension to the belt. This is done before the press closes upon the belt to vulcanize the same. There are two belt-gripping devices at each end of the belt press for concurrently tensioning two belts therein, one of said devices being movable parallel to the plane of the belts and the other being fixed against such movement.

In the closing of the vulcanizer, the lower platen rises until the intermediate platen is engaged, and then both rise until the stationary upper platen is engaged. Elevation of the platens carries upwardly the unvulcanized, tensioned belts thereon, and it is essential that the belt-tensioning structures rise concurrently with and at the same speed as the belts in order that the proper tension on the belts will be maintained. Heretofore various means have been employed for elevating the belt tensioning structures. For example, said structures have been carried by the respective movable platens, but their great weight, especially on the larger presses, has caused the platens to flex or warp with resulting deleterious effect upon the product. In another construction, fluid pressure means have been employed for elevating the belt-stretchers, but even slight leakage in the gaskets or fluid pressure lines causes the stretchers to be out of synchronism with the platens, with resulting non-uniformity of stretch in the finished product.

The chief object of this invention is to provide, in a belt press of the character mentioned, improved means for operating the belt-tensioning devices in synchronism with the operation of the platens of the press. Other objects will be manifest as the specification proceeds.

Of the accompanying drawings:

Figure 2 is a detail end elevation thereof as viewed from the right of Fig. 1; and Figure 3 is a section on the line 3—3 of Fig. 2.

Figure 1:
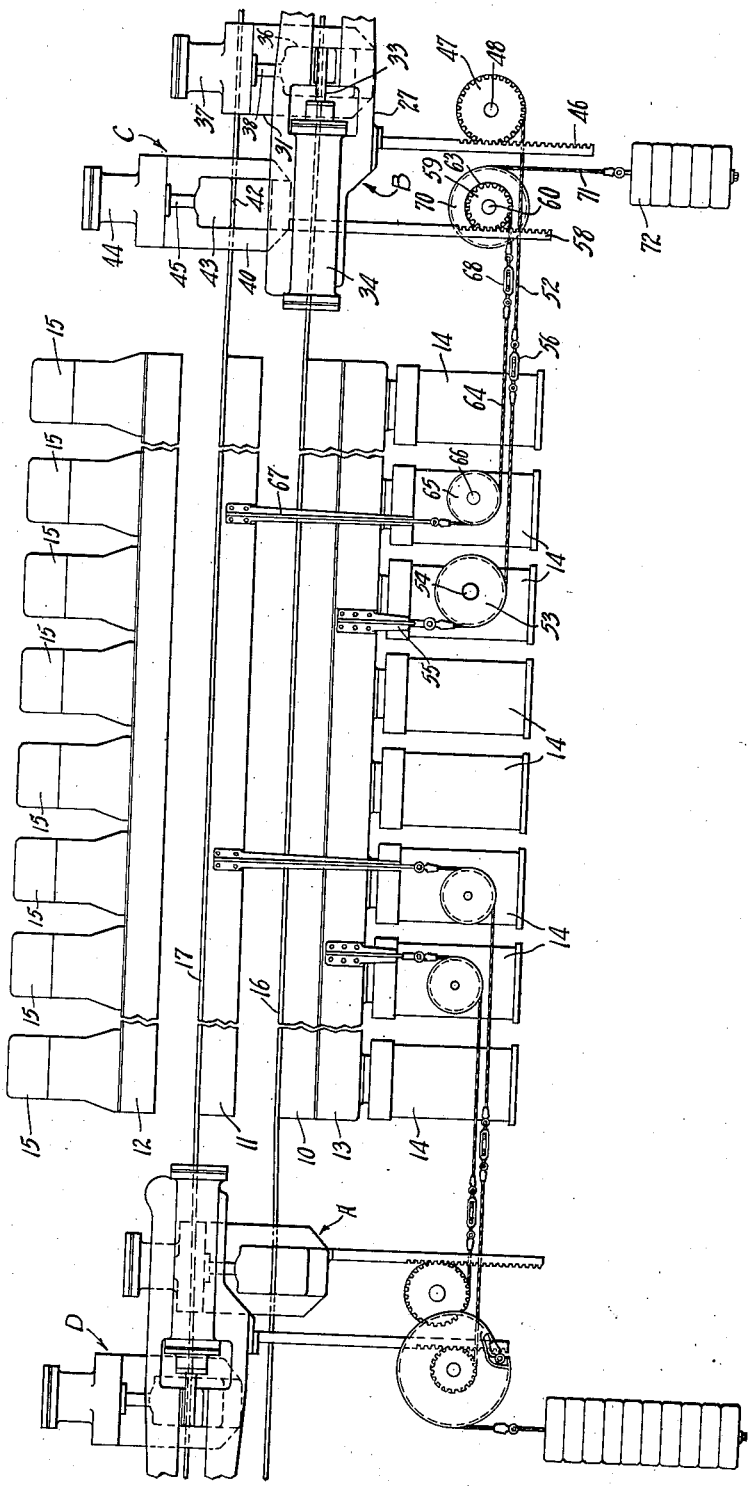
Figure 1 is a diagrammatic representation of a belt press embodying the invention, in its preferred form.

Referring to Figure 1 of the drawings, there is shown the essential elements of a belt press that comprises a lower platen 10, an intermediate platen 11, and an upper platen 12. The lower platen 10 is carried by an elongated press head 13 that is raised and lowered by a plurality of hydraulic rams 14, 14 operating in unison. The upper platen 12 is supported by a plurality of stationary upper press heads 15, 15 corresponding in number to the rams 14 and positioned in opposition thereto. The intermediate platen 11 is suspended from the upper press heads by means (not shown) as is understood by those skilled in the art, and is moved upwardly toward the upper platen 12 by the lower platen 10 when the latter is being lifted by the rams 14. The unvulcanized belts that constitute the work are shown at 16 and 17, the lower belt 16 resting upon lower platen 10 and the upper belt 17 resting upon intermediate platen 11, the press being in open position with the platens spaced apart from each other. The platens are steam heated to vulcanizing temperature in the usual manner.

For imparting determinate tension to the belts 16, 17 during the vulcanization thereof belt tensioning devices for the respective belts are positioned at both ends of the press. Thus the lower belt 16 is engaged at one end by a device that is broadly designated A, which device is fixed against lateral movement toward or away from the press. The other end of belt 16 is engaged by a tensioning device B that is movable laterally toward and away from the press, in the direction of the length thereof, to impart tension to the belt. In like manner the upper belt 17 is engaged at one end by a tensioning device C that is fixed against movement longitudinally of the press, and at its other end by a device D that is movable longitudinally of the press. Tensioning devices A and D are located at one end of the press and devices B and C are located at the other end thereof. The structures previously described are of standard construction and well known in the art. The belt tensioning structures A and B require to be elevated and lowered in unison in synchronism with the raising and lowering of the lower press platen 10, and the structures C and D require to be similarly raised and lowered in synchronism with the intermediate platen 11, the improved means for so raising and lowering the tensioning devices constituting the subject matter of the present invention. Tensioning devices A and D are essentially identical to the tensioning devices B and C so that only the latter need be described, attention being directed to Fig. 2 and Fig. 3 of the drawings for the details thereof.

The construction shown in Figs. 2 and 3 comprises an upright framework that includes lateral frame members 20, 20 that are connected to each other by transverse reinforcing members 21, 22 and 23 that are arranged in pairs at different elevations, said frame members being connected to the platen press at top and bottom by heavy channel members 24, 25 respectively. Formed on the lateral margins of each frame member 20 are finished regions 26, 26, which regions constitute a slideway for a vertically movable slide 27, the latter consisting of lateral members 27a, 27a that are connected to each other by transverse members 28, 28. The lateral members 27a of the slide 27 each have a projecting portion in overhanging relation to the frame 20, which projecting portion is formed, laterally of the frame, with an elongated horizontal slot 30 that constitutes a slideway for a horizontally movable slide 31, the end portions of the latter being mounted in said slideway. The slide 31 is reciprocable longitudinally of the slideway 30, and for affecting reciprocation of said slide, ears 32, 32, Fig. 2, that are formed on the respective ends thereof project through the slots 30, and on the outer side thereof are connected to the ends of respective piston rods 33, 33 of horizontally disposed fluid pressure operated cylinders 34, 34, the same being carried by the respective lateral members 27a of the slide 27. The slide 31 comprises means for gripping the lower belt 16 to be vulcanized, and to this end the upper surface of the cross-piece of said slide is finished, as indicated at 35, Fig. 3, to constitute one element of a work-gripping structure, said surface 35 being substantially in horizontal alignment with the top face of lower platen 10 of the press. Opposed to the work-gripping surface 35 is a vertically movable gripper beam 36, the end portions of which are slidably mounted in the slide structure 31 at opposite sides thereof. Also carried by the slide structure 31 at opposite sides thereof are respective fluid pressure operated cylinders 37, 37, the latter being arranged on vertical axes and having downwardly extending piston rods 38 that are connected at their ends to the ends of the gripper beam 36. The cylinders 37 are arranged to operate in unison to cause the beam 36 to confine the belt 16 between itself and the surface 35, and the cylinders 34 are arranged to operate in unison to move the slide 31 in the direction away from the press to impart tension to the belt 16, it being understood that tensioning means A is provided at the opposite end of the press for gripping the belt thereat to hold it in opposition to the pull of the slide 31 of tensioning means B.

Tensioning means C for the upper belt 17 comprises a vertically movable slide 40 that is mounted upon vertically disposed slideways 41, 41 on the inner faces of the respective lateral frame members 20. The slide 40 spans the space between frame members 20, and comprises a finished upper surface 42 that constitutes one element of a work-gripping structure, said surface being substantially in horizontal alignment with the top face of intermediate platen 11 of the press. Opposed to the work-gripping surface 42 is a vertically movable gripper beam 43, the end portions of which are slidably mounted in the slide structure 40 at the opposite sides thereof. Also carried by the slide structure 40, at the opposite sides thereof, are respective fluid pressure operated cylinders 44, 44 that are arranged on vertical axes and have downwardly extending piston rods 45 that are connected at their ends to the ends of the gripper beam 43. The cylinders 44 are arranged to operate in unison to cause the beam 43 to confine the belt 17 between itself and the surface 42. The tensioning means C is arranged to hold the work 17 in opposition to the tensioning means D at the opposite end of the press, the tensioning means D being similar to tensioning means B previously described in that it is movable in the direction of the length of the press and thereby adapted to apply tension to the work.

As previously stated, during the operation of the press, after the belts 16, 17 have been placed under determinate tension by the tensioning devices described, it is essential that the belt tensioning instrumentalities rise and descend in synchronism with the rise and fall of the platens 10, 11. To this end the slide 31 of tensioning device B as two racks 46, 46 secured thereto and extending downwardly therefrom, said racks being mounted upon suitable slideways formed on the rear margins of the respective lateral frame members 20. Meshed with respective racks 46 are pinions 47, 47 that are mounted upon a shaft 48, the latter being journaled at its respective ends in bearing brackets 49 carried upon bracket-like projections 50 on the frame members 20. For turning the shaft 48, the latter has mounted thereon two, spaced apart, grooved drums 51, 51, each of which has one end of a cable 52 secured thereto, several convolutions of the cable being wound about the drum. The mean diameter of each drum 51 is the same as the pitch diameter of each pinion 47. From the drum 51 each cable 52 extends toward the platen press, being trained about a sheave 53 that is journaled at 54 on the frame of the press and having its end connected to a fixture 55 that is secured to the lower platen 10 of the press. The cable 52 may include a turnbuckle 56 for taking up stretch therein. The arrangement is such that when the lower platen 10 of the press rises, the cables 52 are drawn off the drums 51, thus effecting rotation of the latter and the shaft 48 and pinions 47 in clockwise direction as shown in Figs. 1 and 3, with the result that racks 46 are moved upwardly and carry with them the slide 27 and the belt tensioning mechanism thereon that constitutes the tensioning device B. Because the drums 51 and the pinions 47 are the same effective diameter, the rise of the device B will be at exactly the same speed as the rise of the platen 10, so that no added strain is placed upon the work. The weight of the tensioning device B is such as to cause it to descend by gravity while the platen 10 of the press is being lowered, the interposed gearing between platen and tensioning device preventing the latter from descending faster than the platen. At the opposite end of the press the tensioning device A is connected to the lower platen 10 for concurrent vertical movement therewith in the same manner as tensioning device B.

For raising and lowering the tensioning device C in synchronism with the rise and fall of the intermediate platen 11, the slide 40 of the device C is provided with two racks, such as the rack 58, that extend downwardly therefrom, said racks being mounted in suitable slideways on the inner faces of the respective lateral frame members 20, as is best shown in Fig. 3. Meshed with the respective racks 58 are pinions 59 that are mounted upon the respective ends of a shaft 60, the latter being journaled in bearing brackets 61, 61 carried upon bracket-like projections 62, 62 on the respective lateral frame members 20. For turning the shaft 60, the latter has mounted thereon two, spaced apart, grooved drums, such as the drum 63, Fig. 2, each of which drums has a cable 64 secured thereto, several convolutions of the cable being wound about the drum. The mean diameter of each drum 63 is the same as the pitch diameter of the pinions 59. From the drum 63 each cable 64 extends toward the platen press, being trained about a sheave 65 that is journaled at 66 on the frame of the press and having its end secured to a fixture 67 that is mounted upon the intermediate platen 11 of the press. The cable 64 may include a turnbuckle 68 for taking up any stretch therein. The arrangement is such that rising movement of the intermediate platen 11 will elevate the tensioning device C in same manner that lower platen 10 elevates tensioning device B.

In order to facilitate the elevating of tensioning device C, a pair of spaced apart grooved pulleys 70, 70 are mounted upon shaft 60. Secured at one end to each pulley 70 is a cable 71 that is trained over the pulley and has a counterweight 72 secured to its other end. Shallow pits (not shown) may be provided for receiving the counterweights 72. The cable 71 is so arranged upon pulley 70 that counterweight 72 normally urges the pulley, and the shaft 60, to rotation in the direction that effects the lifting of the tensioning device C. In the opening of the press, the weight of the tensioning device C is sufficient to cause it to descend by gravity, in opposition to the static load imposed by the counterweights 72. In the open position of the press shown in Fig. 1, the counterweights 72 support a part of the weight of the tensioning device C, so that the entire weight thereof is not required to be sustained by the floating intermediate platen 11. At the opposite end of the press the tensioning device D is connected to the intermediate platen 11 for concurrent vertical movement therewith in the same manner as tensioning device C.

It is believed that the operation of the apparatus will be apparent from the foregoing description thereof. The work-tensioning devices rise and descend in synchronism with the rise and fall of the press platens, thus resulting in a superior product having uniform stretch characteristics throughout its length. It will be understood that the two operating cables that extend from each belt-tensioning device to a platen are connected to the latter at opposite sides thereof, thereby equalizing the strains to which the platens are subject.

Modification may be resorted to without departing from the spirit of the invention, or the scope thereof as defined by the appended claims.

What is claimed is:

1. In a belt press, the combination of a platen, means for lifting and lowering the same to close and open the press, belt tensioning devices at opposite ends of the press, each of said belt tensioning devices comprising means for raising and lowering the same, which means comprises a rack that is secured thereto, a pinion meshed with said rack, a drum having driving connection with said pinion, and a cable wound about said drum and so connected to said platen that vertical movement of the latter effects longitudinal movement of said cable to rotate said drum.

2. A combination as defined in claim 1 in which the mean diameter of the drum and the pitch diameter of the pinion are equal.

HARRY A. TRISHMAN.
GEORGE S. ANDRUS.